US005575927A

United States Patent [19]
Sivavec et al.

[11] Patent Number: 5,575,927
[45] Date of Patent: Nov. 19, 1996

[54] METHOD FOR DESTRUCTION OF HALOGENATED HYDROCARBONS

[75] Inventors: Timothy M. Sivavec, Clifton Park; David P. Horney, Mayfield; Sunita S. Baghel, Rensselaer, all of N.Y.

[73] Assignee: General Electric Company, Schenectady, N.Y.

[21] Appl. No.: 498,830

[22] Filed: Jul. 6, 1995

[51] Int. Cl.$^6$ ............................................. C02F 1/70
[52] U.S. Cl. ............................................. 210/757; 210/908
[58] Field of Search ................................. 210/679, 719, 210/746, 747, 757, 908

[56] References Cited

U.S. PATENT DOCUMENTS

| | | | |
|---|---|---|---|
| 3,640,821 | 2/1972 | Sweeny et al. | 210/59 |
| 3,737,384 | 6/1973 | Sweeny et al. | 210/59 |
| 4,382,865 | 5/1983 | Sweeny | 210/743 |
| 4,642,192 | 2/1987 | Heskett | 210/757 |
| 5,266,213 | 11/1993 | Gillham | 210/747 |
| 5,362,402 | 11/1994 | Haitko et al. | 210/908 |
| 5,391,300 | 2/1995 | Webb et al. | 210/692 |
| 5,411,664 | 5/1995 | Seech et al. | 210/908 |
| 5,447,639 | 9/1995 | Sivavec | 210/747 |

FOREIGN PATENT DOCUMENTS

| | | |
|---|---|---|
| 2238533 | 6/1991 | United Kingdom ............... 210/757 |
| 2255088 | 10/1992 | United Kingdom . |
| 2255087 | 10/1992 | United Kingdom . |

OTHER PUBLICATIONS

Tetsuo Senzaki, Kumagai Yasuo, "Removal of Organochloro Compounds by Reduction Treatment (the 2nd report)—Treatment of Trichloroethylene With Iron Powder", Kogyo Yousui (360), 10–25 (Japan) 1989, pp. 11–27.

Tetsuo Senzaki, "Treatment of Organochloro Compound by Reduction Treatment (the 3rd report)—Treatment of Trichloroethylene With Iron Powder" (part 2), Kogyo Yousui (391), 29–35 (Japan) 1991, pp. 1–15.

Tetsuo Senzaki, Kumagai Yasuo, "Removal of Organochloro Compounds by Reductive Treatment—Treatment of 1,1,2,2–tetrachloroethane With Iron Powder", Kogyo Yousui (357), 2–7(Japan) 1988 pp. 1–12.

"Metal–Catalyzed Abiotic Degradation of Halogenated Organic Compounds", Gillham and O'Hannesin, Waterloo Centre for Groudwater Research, Univ. of Waterloo, Ground Water, vol. 29, No. 5, Sep.–Oct. 1991.

Sweeny, K. H., "Reductive Degradation: Versatile, Low Cost" Water & Sewage Works, Jan., 1979, pp. 40–42.

*Primary Examiner*—Peter A. Hruskoci
*Assistant Examiner*—Theodore M. Green
*Attorney, Agent, or Firm*—James Magee, Jr.

[57] ABSTRACT

Iron and ferrous sulfide in specific amounts are combined under aerobic or anaerobic conditions to reduce halogenated hydrocarbons in aqueous compositions to non-toxic by-products at near neutral pH and Eh values below −325 mV. The combination of iron metal and ferrous sulfide in relative amounts gives the unexpected result of a faster reduction rate using iron or ferrous sulfide alone and a controlled pH.

4 Claims, No Drawings

METHOD FOR DESTRUCTION OF HALOGENATED HYDROCARBONS

FIELD OF THE INVENTION

The present invention relates to a method for dehalogenation of halogenated organic compounds in contaminated aqueous compositions. Particularly, the invention relates to an increased dehalogenation rate of organic compounds using iron and iron sulfide. More particularly, the invention dechlorinates aliphatic hydrocarbons at negative Eh values below −325 mV at pH values around 6.0 to 8.0.

BACKGROUND OF THE INVENTION

Polychlorinated hydrocarbons, such as carbon tetrachloride, chloroform, trichloroethylene, and tetrachloroethylene have been widely used as chemical intermediates, solvents for dry cleaning of clothing, in degreasing operations, and in a variety of other applications. Chlorinated hydrocarbons are very stable compounds and are relatively toxic at low levels.

Due to this fact, chlorinated hydrocarbons have been accumulating in the environment, particularly in groundwaters. Groundwaters have become contaminated by chlorinated hydrocarbons from sources such as disposal facilities, chemical spills, and leaking underground storage tanks. As analytical detection limits have improved, trace amounts of chlorinated hydrocarbons have been detected in many water supplies, causing public concern. Although the use of chlorinated degreasing solvents was severely curtailed in 1976, their improper storage and uncontrolled disposal practices resulted in significant contamination in groundwater aquifers. Due to their high water solubility (e.g., 1100 mg/L TCE at 25° C.), chlorinated solvents are highly mobile in soils and water aquifers. Additionally, dechlorination of trichloroethylene and perchloroethylene by native microorganisms under reducing conditions may also produce appreciable concentrations of partially reduced products, such as dichloroethylene (DCE) and vinyl chloride (VC), in native aquifers. These products also pose serious health concerns.

To date the most commonly applied treatment scheme for contaminated groundwater has been pump-and-treat. The most practical way for doing this has been to withdraw the contaminated water from a well, volatilize the contaminants in an air stripping tower, and adsorb the vapor phase contaminants onto granular activated carbon (GAC). However, there is growing awareness of the limitations of such pump-and-treat technologies in that contaminated site require treatment often for many decades.

As a result, pollution of water by chlorinated hydrocarbons as become an important environmental problem and contaminated groundwaters represent a large portion of environmental remedial action plans throughout the world.

Chlorinated compounds can be degraded by reductive dechlorination, that is, replacement of chlorine substituents by hydrogen. Metallic elements, such as iron and zinc, have been used to degrade chlorinated organic compounds.

In the patent literature, patents are issued that use metals or metallic couples to degrade chlorinated organic compounds. In U.S. Pat. No. 3,640,821 to K. H. Sweeney and J. R. Fischer, metallic zinc is used for removing pesticides from aqueous solutions. U.S. Pat. No. 3,737,384, also to Sweeney and Fischer, discloses the use of metallic couples, in solutions buffered to near neutral pH for the degradation of pesticides.

More recently, researchers in Japan have reported on the degradation of 1,1,2,2-tetrachloroethane and trichloroethylene in aqueous solution in the presence of iron powder: Senzaki, T. and Y. Kumagai, "Removal of Chlorinated Organic Compounds from Wastewater by Reduction Process: II. Treatment of Trichloroethylene with Iron Powder" Kogyo Yosui, 1989, 369, 19–25. Gillham and O'Hannesin in their article "Metal-Catalyzed Abiotic Degradation of Halogenated Organic Compounds" IAH Conference on Modern Trends in Hydrogeology: Hamilton, Ontario, May 10–13, 1992, have extended the list of chlorinated solvents that can be reduced by iron metal. Recently, Gillham received a U.S. Pat. No. 5,266,213, for his method for cleaning halogenated contaminants from groundwater. The process involves feeding contaminated groundwater through a trench containing a metal such as iron, under strict exclusion of oxygen, and over a lengthy period of time.

Commonly owned and assigned co-pending U.S. patent application Ser. No. 08/318,151, U.S. Pat. No. 5,447,639, issued Sep. 5, 1995, under anaerobic conditions, uses ferrous sulfide to reductively dechlorinate chlorinated hydrocarbons.

The use of a reactive metal or metallic compound, such as iron or zinc, to treat a contaminated groundwater or process stream results in the treated water having a very high pH. pH's in the range 9 to 10 are commonly observed when groundwaters are treated with iron metal in a continuous-flow column owing to the water itself serving as the oxidant. These corrosion processes result in increased pH in weakly buffered systems, such as in carbonated-buffered groundwaters.

Under reducing conditions, the pH increase also favors the formation of iron hydroxide precipitates, i.e., $Fe(OH)_3$ and $Fe(OH)_2$. The formation of a surface layer of precipitates inhibits further dissolution of the iron and inhibits reduction of chlorinated organic compounds by forming a barrier between the reactive iron and the adsorbed chlorinated organic compound.

The oxidation-reduction or redox reaction is controlled by the oxidation potential of the aqueous solution or Eh. A positive Eh indicates that an aqueous phase is oxidizing; a negative value indicates that it is reducing. Although it is difficult to accurately measure in situ Eh in groundwater, there is some evidence to suggest that a range of Eh from −0.2 to +0.7 V can occur. Dissolved oxygen present in aerobic aquifers may be chemically reduced by contact with a variety of reducing species, including reactive metals. This results in the lowering of the Eh of the groundwater and makes reductive dechlorination more favorable.

The reduction process is also a pH-dependent reaction, in which lower pH promotes a faster reaction rate over the pH range 6.0 to 8 relative to the pH range 9 to 10. Hence, a reducing composition or mixture that controls the pH and also lowers the oxidation potential (Eh) of the aqueous phase would greatly improve the process by which chlorinated solutes in water are reductively dechlorinated by contacting them with a reactive metal phase such as iron metal.

SUMMARY OF THE INVENTION

The present invention provides an enhanced remediation method to dehalogenate contaminated aqueous compositions contaminated with halogenated hydrocarbon compounds under aerobic or anaerobic conditions, by reacting the contaminated aqueous compositions with an effective amount of an admixture of iron and ferrous sulfide to maintain a pH of said aqueous composition from about 6.0 to 8.5 at ambient temperature for a sufficient amount of time to substantially dehalogenate the halogenated hydrocarbon compounds.

Additionally, the invention encompasses a method to dechlorinate aqueous compositions contaminated with chlorinated hydrocarbon compounds under aerobic or anaerobic conditions by contacting the contaminated aqueous composition with an effective amount of an admixture of iron and ferrous sulfide to lower an oxidation potential of the aqueous composition below about −325 mV, at ambient temperature until the chlorinated hydrocarbon compounds are substantially dechlorinated. For example, trichloroethylene is reduced to ethane, ethene, and chloride ion. Likewise, carbon tetrachloride would produce methane and chloride ion.

Halogenated hydrocarbons, and specifically, chlorinated hydrocarbons, are reduced to non-toxic by-products when contacted with a mixture of commercial iron (II) sulfide and iron under aerobic and anaerobic conditions. The reaction proceeds, in situ or ex situ, in a manner where the combination of iron sulfide with iron metal in certain weight percentages or ratios, maintains the pH of the contaminated aqueous compositions between about 6.0 and 8.5, and more specifically between 6.4 and 8.0. As a result, the near neutral pH and the negative Eh values promote reducing conditions.

STATEMENT OF THE INVENTION

This invention relates to a process for cleaning groundwater, process and waste water, wells, ponds, and streams that are contaminated with halogenated solvents including trichloroethylene, dichloroethylene, vinyl chloride, perchloroethylene, dichloroethane, trichloroethane, carbon tetrachloride and chloroform. Dehalogenation of these solvents in the vapor phase may also be achieved. Vapor phase capture and destruction of halogenated solvents finds application in the treatment of airstreams emanating from air strippers and soil vapor extraction wells.

Iron metal filings or another form of a reactive metal is combined with ferrous sulfide, FeS, in an effective amount to substantially dehalogenate the halogenated organic contaminants in aqueous compositions.

An effective amount of a reactive metal, such as iron, zinc, aluminum, and mixtures thereof, is about seventy to ninety-nine weight percent in combination with an effective amount of iron (II) sulfide, which is about one to thirty weight percent ferrous sulfide. The contemplated ratios of the iron/ferrous sulfide admixture are about 100/1 to about 3/1. The preferred amount is about 10/1 to 5/1 of iron metal to iron (II) sulfide. An effective amount of the iron/ferrous sulfide admixture reduces the halogenated hydrocarbons to less than 2 parts per million.

In the practice of this invention, granular ferrous sulfide and iron metal may be filled into a pit, ditch, screened well, or trench and used to react with and degrade halogenated organic compounds, such as chlorinated organic compounds, and particularly aliphatic chlorinated hydrocarbons, in a migrating plume, such as groundwater aquifers and drainage runoffs. A granular or sufficiently coarse iron metal and ferrous sulfide would be used so that groundwater flow would not be impeded. Alternatively, the present invention may be operated by packing a column with ferrous sulfide and iron. Industrial wastewater or pumped groundwater may be treated in this manner, as well as other contaminated solutions.

Additionally, an inert filler, such as sand, gravel, pebbles, and the like, may also be added to the ferrous sulfide and iron metal to increase the hydraulic conductivity of the reaction zone between the chlorinated hydrocarbons and the ferrous sulfide and iron metal. Polymeric sorbents, such as, but not limited to, polyethylene, polypropylene, thermoplastic elastomers, and carbon-filled rubbers, may also be admixed with the granular ferrous sulfide and iron metal.

In one embodiment of this invention, it is contemplated that an in situ trench would be excavated to intercept a migrating plume of contaminated aqueous compositions, such as groundwater. The trench would be filled with the mixture of iron/ferrous sulfide. The iron metal filings-ferrous sulfide mixture would provide a permeable, reactive wall through which groundwater would flow. The dimensions of the reactive wall would be designed so as to afford an optimal residence time during which the chlorinated solvents would be fully degraded. The chlorinated solvent would be degraded to nonhazardous, fully-dechlorinated products (e.g., chloride ion and ethene/ethane from perchloroethylene, trichloroethylene, dichloroethyelene, and vinyl chloride). The invention is practiced under ambient conditions. Ambient temperature for groundwater may be as low as 4° C.

In an ex situ application, a column would be packed with the ferrous sulfide and iron or a mixture of ferrous sulfide, iron, and sand. Groundwater or industrial wastewater would then be passed through this packed column. Column dimensions and water input flow would chosen to provide an optimal residence time during which the chlorinated solvents would be fully degraded.

The following examples further serve to demonstrate the invention.

EXAMPLE 1

The following example illustrates that TCE is rapidly dechlorinated to chloride ion and ethene, ethane and other minor C3, C4, and C5 hydrocarbon products when contacted with a mixture of iron filings and ferrous sulfide. An accelerated reaction rate is unexpectedly obtained by using a mixture of iron and ferrous sulfide to dechlorinate the composition as compared to 100 percent iron or 100 percent ferrous sulfide.

To each of six 120 milliliter borosilicate glass serum vials was added 25.0 grams iron filings and 5.0 grams granular ferrous sulfide. To a second series of six vials was added only 25.0 grams of iron filings and to a third series of six vials was added only 25.0 grams of granular ferrous sulfide. The vials were then filled completely with 120 milliliter of an aqueous trichloroethylene solution prepared from nitrogen-sparged, Milli-Q-filtered deionized water. The initial concentration of the trichloroethylene was between about 5.77–16.64 milligram per liter. A sufficient number of vials were prepared to accommodate selected sample times.

The vials contained no headspace and were capped with Teflon-lined septa and sealed with an aluminum crimp cap. The contents were mixed by rotation of the vials on a jar mill set at 35 revolutions per minute. All experiments were conducted at ambient temperature (25° C.). After 72 hours, the vials were removed from the jar mill and the contents were allowed to settle.

Aliquots (5.0 ml) of the aqueous solution were removed from the vials at selected sample times via gas-tight syringe and were extracted with an equal volume (5.0 ml) of high resolution GC grade n-hexane. The trichloroethylene concentration in the hexane extracts were analyzed by gas chromatography employing a [63]nickel electron-capture detector and a capillary analytical column (BD-1 methylsilicone; 30 m×0.32 mm i.d.; 1 µm film thickness, J&W Scientific). The following gas chromatography program was used: 50° C. for 2 minutes, 20° C. per minute to 120° C., 120° C. for ten minutes. Trichloroethylene standards ranging from 1 µg per liter to 50 milligrams per liter were used to calibrate the gas chromatography-electron capture detector response.

The aqueous phase was also analyzed by purge-and-trap GC-FID (gas chromatography by flame ionization detection) using a purge-and-trap concentrator and an autosampler. A fused silica $Al_2O_3/Na_2SO_4$ analytical column was used to achieve separation of C1–C5 hydrocarbon gases. The following gas chromatography temperature program was used: 75° C. for 5 minutes, 20° C./minute to 200° C., 200° C. for ten minutes. Samples of the settled aqueous phase (5.0 ml) were withdrawn by gas-tight syringe and loaded directly onto the autosampler. Ethane, ethene, ethyne, propane, propene and seven C4 hydrocarbons were calibrated from mixtures in nitrogen by a direct injection method. All sampled vials were sacrificed for chloride ion or pH measurements of the aqueous phase.

Chloride ion analysis was conducted by ion chromatography. A method detection limit of 0.03 milligrams per liter chloride ion was measured. pH measurements were conducted using a combination pH/reference electrode, standardized with pH 7 and 10 buffers.

Table 1(A–C) shows the results of the accelerated rate of dechlorination of trichloroethylene (TCE) in a contaminated aqueous composition using a Fe/FeS admixture. Table 1A gives data for iron/ferrous sulfide (Fe/FeS), while Table 1B gives data for 100% Fe, and Table 1C gives data for 100% FeS. The aqueous TCE concentration data at selected reaction times, expressed in terms of milligrams per liter (mg/L) is shown. Concentrations of chloride ion, expressed in terms of mg/L Cl⁻, and pH measurements are also shown.

TABLE 1

Reductive Dechlorination of Aqueous TCE

TABLE 1A
25.0 g iron filings and 5.0 g ferrous sulfide

| time h | [TCE] mg/L | C/Co * | chloride ion mg/L | pH |
|---|---|---|---|---|
| 0 | 15.05 | 1.000 | <0.1 | 7.1 |
| 3 | 8.86 | 0.589 | — | 7.0 |
| 6 | 6.69 | 0.444 | 4.8 | 7.0 |
| 24 | 0.73 | 0.048 | 9.6 | 7.0 |
| 48 | 0.04 | 0.003 | 12.2 | 7.0 |
| 72 | n.d. | — | 13.1 | 7.0 |

* C/Co - remaining concentration/ initial concentration

TABLE 1B
25.0 g iron filings

| time h | [TCE] mg/L | C/Co * | chloride ion mg/L | pH |
|---|---|---|---|---|
| 0 | 16.64 | 1.000 | <0.1 | 7.1 |
| 6 | 11.06 | 0.665 | 3.5 | 8.7 |
| 24 | 4.63 | 0.278 | 9.5 | 8.7 |
| 48 | 0.95 | 0.057 | 11.8 | 8.7 |
| 72 | 0.38 | 0.023 | 12.9 | 8.7 |

TABLE 1C
25.0 g ferrous sulfide

| time h | [TCE] mg/L | C/Co * | chloride ion mg/L | pH |
|---|---|---|---|---|
| 0 | 5.77 | 1.000 | — | 6.9 |
| 3 | 5.27 | 0.914 | — | 6.6 |
| 6 | 5.28 | 0.916 | — | 6.5 |
| 24 | 2.63 | 0.456 | — | 6.4 |
| 48 | 1.37 | 0.238 | — | 6.1 |
| 72 | 0.215 | 0.037 | — | 6.2 |

EXAMPLE 2

The following example illustrates that a mixture of iron filings and ferrous sulfide controls the aqueous phase pH in a continuous flow column application, which enables improved reaction rates for dechlorination of TCE in ex-situ applications. Three different column influents used were deionized Milli-Q water, uncontaminated groundwater, and groundwater contaminated with about 1 milligram per liter of trichloroethylene.

The continuous flow column experiment was conducted using a series of four 1 inch diameter glass columns (one 6 inches long and three 12 inches long) filled with a mixture of 92 weight percent iron filings and 8 weight percent ferrous sulfide. The cumulative column volume was 617 cc, with a total weight of 1630.3 grams of the iron-ferrous sulfide mixture. The average porosity was 61.7 percent. Each column was similarly packed with the iron filings-ferrous sulfide mixture. The columns were capped with 10–20 µm glass frits (1 in. diam.) and Teflon end caps connected to ⅛ in. Teflon tubing.

A Teflon piston pump was used to pump the deionized water or groundwater into the columns set in series. Sampling was performed at sample ports directly before every column and at the end of the last column in the series. Each influent flowed through the columns at an input flow rate of 2.00 milliliters per minute, with a cumulative residence time of 204.65 minutes. Flow direction was from bottom to top. Similar experiments were conducted using 100 percent iron as the reactive metal packed in the columns.

Column influent and effluent pH was measured for the deionized Milli-Q water, the uncontaminated site groundwater and the site ground water contaminated with approximately 1 milligram per liter trichloroethylene. The results are shown in Table 2. Note that in each example where the iron/ferrous sulfide is used that the pH is held at 6.8–6.9 while in a similar column experiment in which the columns were packed with only iron filings the pH increased to above 9.0.

TABLE 2

Influent and Effluent pH's of Column-Treated Water
Column: 92% iron filings/8% ferrous sulfide (weight %)

TABLE 2A

| water source | influent pH | effluent pH |
|---|---|---|
| deionized Milli-Q water | 7.0 | 6.9 |
| groundwater uncontaminated | 6.8 | 6.8 |

TABLE 2-continued

Influent and Effluent pH's of Column-Treated Water
Column: 92% iron filings/8% ferrous sulfide (weight %)

TABLE 2A

| water source | influent pH | effluent pH |
| --- | --- | --- |
| groundwater contaminated with approx. 1 mg/L TCE | 6.8 | 6.8 |

TABLE 2B

Influent and Effluent pH's of Column-Treated Water
Column: iron 100% filings

| water source | influent pH | effluent pH |
| --- | --- | --- |
| deionized Milli-Q water | 7.0 | 9.5 |
| groundwater uncontaminated | 6.8 | 9.8 |
| groundwater contaminated with approx. 1 mg/L TCE | 6.8 | 9.4 |

EXAMPLE 3

The following example serves to show that the addition of ferrous sulfide in an amount of 2–20 weight percent to iron filings adjusts both the pH and the oxidation-reduction potential of the aqueous phase to give unexpected results of improved reaction rate and maintenance of pH during the reaction. Variable amounts of ferrous sulfide were added to 25.0 grams of iron filings.

The procedure followed was: to ten 120 milliliter borosilicate glass vials was added 25.0 grams iron filings and variable weights of granular ferrous sulfide (0,0.05,0.10, 0.25,0.50,0.75,1.00,2.50, and 5.00 grams). One hundred milliliters of Milli-Q filtered deionized water was added to each vial. The vials containing approximately 10 cubic centimeters of headspace were capped with Teflon-lined septa and sealed with an aluminum crimp cap. The contents were rolled on a jar mill at 35 revolutions per minute. All experiments were conducted at ambient temperature (25° C.).

After 72 hours the vials were removed from the jar mill and the contents were allowed to settle. The pH and the Eh of the aqueous phase of each vial was measured. Measurement of pH was conducted using a combination pH/reference electrode, standardized with pH 7 and 10 buffers. Measurement of Eh was performed using a micro redox electrode and a micro reference electrode. Table 3 demonstrates that increasing amounts of ferrous sulfide lowers the oxidation potential (Eh) and the pH of the aqueous phase.

TABLE 3 pH and Oxidation-Reduction Potentials
Measured for Iron Filing-Ferrous Sulfide Mixtures

| weight of iron filings, g | weight of ferrous sulfide, g | pH | oxidation-reduction potential, mV |
| --- | --- | --- | --- |
| 25.0 | 0 | 10.5 | 17 |
| 25.0 | 0.05 | 10.1 | −62 |
| 25.0 | 0.10 | 9.6 | −140 |
| 25.0 | 0.25 | 9.8 | −170 |
| 25.0 | 0.50 | 9.7 | −217 |
| 25.0 | 0.75 | 9.7 | −223 |
| 25.0 | 1.00 | 9.0 | −240 |
| 25.0 | 2.50 | 8.2 | −325 |
| 25.0 | 5.00 | 6.5 | −371 |
| 0 | 0 | 7.00 buffer | 296 |

What is claimed is:

1. A method for decontamination of aqueous compositions contaminated with halogenated hydrocarbon compounds by reductive dehalogenation of said compounds at a buffered pH of from about 6.0 to about 8.5 and an oxidation-reduction potential of less than about −325 mV obtained by contacting the contaminated aqueous composition with an effective amount of a composition comprising metallic iron and ferrous sulfide in an admixture of about 1–30 weight percent ferrous sulfide and 70–99 weight percent iron.

2. A method according to claim 1 where the halogenated hydrocarbon is a chlorinated hydrocarbon.

3. A method according to claim 2 where the chlorinated hydrocarbon is an aliphatic chlorinated hydrocarbon.

4. A method according to claim 3 where the aliphatic chlorinated hydrocarbon is selected from the group consisting of trichloroethylene, dichloroethylene, vinyl chloride, tetrachloroethylene, dichloroethane, trichloroethane, carbon tetrachloride, dichloromethane, chloroform, and mixtures thereof.

* * * * *